United States Patent [19]

Bistline et al.

[11] Patent Number: 4,460,851
[45] Date of Patent: Jul. 17, 1984

[54] COMBINED DYNAMIC FOCUS CIRCUIT FLYBACK CAPACITOR

[75] Inventors: William R. Bistline; Stephen C. Hatcher, both of Austin, Tex.

[73] Assignee: International Business Machines Corporation, Armonk, N.Y.

[21] Appl. No.: 306,560

[22] Filed: Sep. 28, 1981

[51] Int. Cl.³ .................... H01J 29/70; H01J 29/76
[52] U.S. Cl. .................................. 315/408; 315/382; 315/411
[58] Field of Search .......... 315/382, 408, 411, 31 TV, 315/403, 364; 358/218, 190

[56] References Cited

U.S. PATENT DOCUMENTS

| | | | |
|---|---|---|---|
| 3,146,373 | 8/1964 | Janssen | 315/22 |
| 3,177,396 | 4/1965 | Brooks | 315/31 |
| 3,501,671 | 3/1970 | Buechel . | |
| 3,935,529 | 1/1976 | Kalmanash et al. | 315/411 |

FOREIGN PATENT DOCUMENTS 195977 2/1958 Austria .
1577267 10/1980 United Kingdom .

Primary Examiner—Theodore M. Blum
Assistant Examiner—Gregory C. Issing
Attorney, Agent, or Firm—Douglas H. Lefeve

[57] ABSTRACT

In a cathode ray tube (CRT) display system utilizing a semiconductor switch in the output stage of the fast scan axis, a resonant circuit is coupled to the flyback circuit for production of a dynamic focus voltage. The capacitance required for the flyback circuit is derived from the equivalent capacitance of the dynamic focus resonant circuit, thereby eliminating the need for a separate flyback capacitor.

8 Claims, 3 Drawing Figures

COMBINED DYNAMIC FOCUS CIRCUIT FLYBACK CAPACITOR

BACKGROUND OF THE INVENTION

1. Field of the Invention

This invention relates to CRT circuits in general and more particularly to a combined flyback deflection circuit and dynamic focus circuit.

2. Description of Prior Art (Prior Art Statement)

Representative of the closest known prior art is U.S. Pat. No. 3,146,373 to P. J. H. Janssen, filed Jan. 11, 1961 (priority Feb. 17, 1960), issued Aug. 25, 1964, entitled "Circuit Arrangement for Dynamic Post-Focusing in Electrostatic Focusing Cathode-Ray Tubes", and U.S. Pat. No. 3,177,396 to F. E. Brooks, filed Apr. 2, 1962, issued Apr. 6, 1965, entitled "Dynamic Focus Circuit".

In CRT display systems some means for focusing the electron beam within the CRT is normally utilized. Such focusing may be either of a magnetic nature or an electrostatic nature. For electrostatic focusing a positive voltage substantially lower than the second anode voltage is typically applied to a focus grid of the CRT. For high resolution in CRT displays it has been found necessary to dynamically vary this focus voltage as the electron beam is moved about the face of the CRT. Typically this voltage varies in the form of a parabolic function.

U.S. Pat. Nos. 3,146,373 and 3,177,396 show examples of television type deflection circuits which include a dynamic focusing function. In each of these circuits the CRT second anode high voltage and the electromagnetic beam deflection current, as well as the dynamic focusing voltage are generated within the same vacuum tube controlled circuit. This provides economies in components when the functions are implemented in a common circuit. However, since the peak flyback voltage and pulse width are controlled by the self resonance of the flyback transformer alone, neither has the repeatability required in a high density data display.

A solution to the problem of poor repeatability is to include a discrete flyback capacitor in the circuitry which, because of its much larger capacitance, controls the resonance of the flyback circuit. FIG. 2, herein, shows a classical CRT flyback type deflection circuit employing a deflection yoke Ly having one end connected to a voltage source and the other end connected through a switch in the form of transistor 22 to ground. Turning on transistor 22 causes a ramp of current to flow in the deflection yoke Ly for CRT beam deflection. At the end of each trace of the CRT beam the flyback components including diode 23 and flyback capacitor 24 provide for a rapid retrace of the electron beam by restoring the yoke current to a negative peak value which then ramps back up to zero at which time the cycle repeats.

It is also known in the prior art to provide dynamic focus circuitry in conjunction with the beam deflection circuitry in transistorized CRT display systems wherein the peak flyback voltage is much more critical than in vacuum tube embodiments. Similarly, in high density display applications the duration of the flyback pulse must not be excessive and must be accurately controlled. Such a combination beam deflection/dynamic focus circuit is shown in FIG. 3 wherein the deflection yoke Ly, transistor switch 32, diode 33, and cacitor 34 perform the same functions as described above relative to yoke Ly, transistor 22, diode 23, and capacitor 24. Coupled to the basic flyback circuit by capacitor C2 is a resonant tank circuit including inductor L1 and capacitor C3 which provide a parabola shaped dynamic focus voltage during the active scan portion of the CRT beam deflection cycle. This dynamic focus voltage is capacitively coupled through capacitor 38 to the focus grid of the CRT.

Although the combined beam deflection/dynamic focus circuit shown in FIG. 3 effectively accomplishes both of the functions for which it was designed, it has been found by this invention as described below, that these functions can be provided as effectively as with the FIG. 3 circuit by elimination of one of the previously considered fundamental components therein.

SUMMARY OF THE INVENTION

In accordance with this invention we have discovered that the combination of the capacitor used to couple the dynamic focus tank circuit to the flyback circuit and the tank circuit components themselves, including the inductor and parallel capacitor, all together form an equivalent capacitance which, through proper design, eliminates the necessity of including a separate flyback capacitor (such as capacitor 24 in FIG. 2 and capacitor 34 in FIG. 3) in the semiconductor switched, combination flyback beam deflection/dynamic focus circuit. Thus, the dynamic focus circuit by itself provides the function of the capacitive load for the flyback circuit. The benefits derived by the elimination of the separate load capacitor in the flyback circuit include enhanced reliability of the circuitry due to fewer stressed components, a savings of space on the printed circuit board on which the circuit is implemented, and the cost of the high voltage load capacitor for the flyback circuit.

The foregoing and other features, extensions, and advantages of the invention will be apparent from the following more particular description of the preferred embodiment of the invention, as illustrated in the accompanying drawing.

DESCRIPTION OF THE PREFERRED EMBODIMENT

Figure 2:
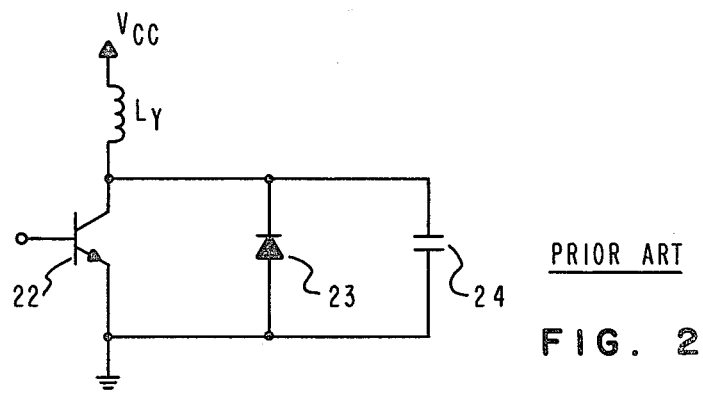
FIG. 2 is a circuit diagram of a prior art CRT flyback beam deflection circuit.
Figure 3:
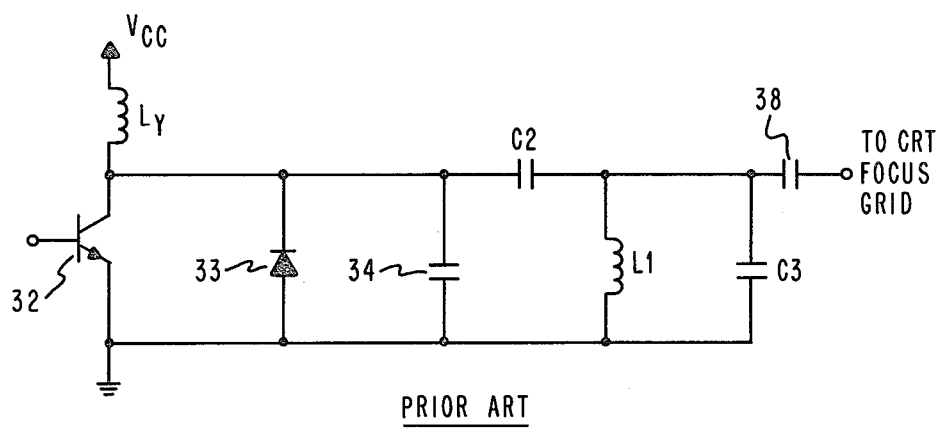
FIG. 3 is a circuit diagram of a prior art flyback beam deflection circuit in combination with a dynamic focus circuit.

As described above FIG. 2 shows a classical output stage for a transistorized flyback deflection circuit. FIG. 3 also shows a prior art circuit that combines the flyback deflection circuit of FIG. 2 with a tank circuit to develop a parabola shaped dynamic focus voltage at the output terminal thereof. A necessary component of the FIG. 2 circuit is the flyback capacitor 24. The capacitor to provide this function in the FIG. 3 circuit is capacitor 34.

In FIG. 3, the impedance, Z, of the network formed by capacitor C2 in series with the parallel combination of inductor L1 and capacitor C3 is shown to be:

$$Z = \frac{1}{sC2} + \frac{\frac{sL1}{sC3}}{sL1 + \frac{1}{sC3}}$$

$$= \frac{1}{sC2} + \frac{sL1}{s^2L1C3 + 1}$$

$$= \frac{(1)(s^2L1C3 + 1)}{(sC2)(s^2L1C3 + 1)} + \frac{sL1(sC2)}{(s^2L1C3 + 1)(sC2)}$$

$$= \frac{s^2L1C3 + 1 + s^2L1C2}{(s^2L1C3 + 1)(sC2)}$$

$$= \frac{s^2L1(C2 + C3) + 1}{(s^2L1C3 + 1)(sC2)}$$

Now substituting $j\omega$ for s:

$$Z = \frac{1 - \omega^2L1(C2 + C3)}{j\omega C2(1 - \omega^2L1C3)}$$

$$Z = \frac{1}{j\omega} \cdot \frac{1 - \omega^2L1(C2 + C3)}{C2(1 - \omega^2L1C3)}$$

$$Z = \frac{1}{j\omega Ceq};$$

where:

$$Ceq = \frac{C2(1 - \omega^2L1C3)}{1 - \omega^2L1(C2 + C3)}$$

During flyback the yoke inductance Ly and capacitance Ceq resonate at a frequency of:

$$\omega = \frac{1}{\sqrt{LyCeq}}$$

Therefore:

$$\omega^2 = \frac{1}{LyCeq}; \text{ and}$$

$$\omega^2 LyCeq = 1.$$

Now substituting the expression derived above for Ceq into the immediately preceding equation:

$$1 = \omega^2 Ly \cdot \frac{C2(1 - \omega^2L1C3)}{1 - \omega^2L1(C2 + C3)}$$

Therefore:

-continued
$$1 - \omega^2L1(C2 + C3) = \omega^2Ly(C2)(1 - \omega^2L1C3)$$
$$= \omega^2LyC2 - \omega^4LyL1C2C3$$

And:

$$\omega^4LyL1C2C3 - \omega^2(LyC2 + L1(C2 + C3)) + 1 = 0$$

Using the Quadratic equation to solve for $\omega^2$:

$$\omega^2 = \frac{LyC2 + L1(C2 + C3) + \sqrt{(LyC2 + L1C2 + L1C3)^2 - 4(L1LyC2C3)}}{2LyL1C2C3}$$

However:

$$Ceq = \frac{1}{\omega^2Ly}$$

Thus, substituting in the above equation for $\omega^2$ from the solution to $\omega^2$ obtained in the quadratic equation above:

$$Ceq = \frac{1}{\omega^2Ly} = \frac{1}{Ly} \cdot \frac{2LyL1C2C3}{LyC2 + L1(C2 + C3) + \sqrt{(LyC2 + L1C2 + L1C3)^2 - 4(L1LyC2C3)}}$$

$$Ceq = \frac{2L1C2C3}{LyC2 + L1(C2 + C3) + \sqrt{(LyC2 + L1C2 + L1C3)^2 - 4(L1LyC2C3)}}$$

Thus, Ceq is an effective capacitance totally determined by the four passive components Ly, L1, C2, and C3. Further, this effective capacitance is independent of frequency.

Figure 1:
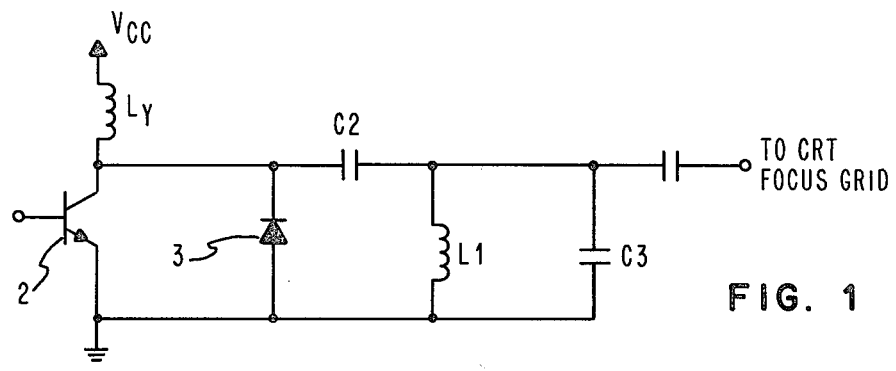
FIG. 1 is a circuit diagram of the combined CRT beam deflection and dynamic focus circuit of this invention which eliminates the necessity of including a separate flyback load capacitor.

FIG. 1 shows the implementation of this invention in a combined beam deflection/dynamic focus circuit for a CRT which eliminates the necessity of including a separate flyback capacitor. In this circuit the combined effect of the inductances of the yoke Ly and inductor L1 and the capacitances of capacitors C2 and C3 produce and effective capacitance in the circuit in parallel with diode 3 so as to eliminate a separate flyback capacitor, such as capacitor 34 in the circuit of FIG. 3.

A number of benefits accrue due to the elimination of this separate flyback capacitor. The circuit now includes one less stressed component which substantially enhances the reliability of the circuit. Further, a savings of space on the printed circuit board is realized due to the elimination of the flyback capacitor. A cost reduction in the circuit is realized by the elimination of the high voltage flyback capacitor which, in production quantities, represents a very significant benefit of the circuit.

Thus, a circuit has been desribed for use in a cathode ray tube display system utilizing a semiconductor switch in the output stage of a resonant scan beam deflection circuit. The circuit combines the functions of flyback type beam deflection and dynamic focus voltage generation in a manner so as to eliminate the need for a separate flyback capacitor which, in the prior art, has been necessary in circuits of this type.

While the invention has been shown and described with reference to a particular embodiment thereof, it will be understood by those skilled in the art that various changes in form and details may be made therein without departing from the spirit and scope of the invention.

What is claimed is:

1. In a CRT display system utilizing a semiconductor switch in the fast scan axis output stage of a flyback beam deflection circuit, the improvement comprising a resonant circuit coupled to said flyback circuit for production of a dynamic focus voltage waveform and for providing the only flyback capacitance of the circuit.

2. In the CRT display system of claim 1, wherein said resonant circuit comprises a parallel resonant tank circuit including a first inductor and a first capacitor.

3. In the CRT display system of claim 2, wherein said resonant circuit is capacitively coupled to said flyback circuit by a second capacitor.

4. In the CRT display system of claim 3, wherein a node, to which is connected a terminal of each of said first and second capacitors and said inductor, is capacitively coupled to a cathode ray tube focus grid by a third capacitor.

5. In the CRT display system of claim 4, wherein said flyback beam deflection circuit includes a deflection yoke and the flyback capacitance $C_{eq}$ of said resonant circuit coupled to said flyback circuit is:

$$Ceq = \frac{2L1C2C1}{LyC2 + L1(C2 + C1) + \sqrt{(LyC2 + L1C2 + L1C1)^2 - 4(L1LyC2C1)}}$$

where:

L1 = inductance of said first inductor;
Ly = inductance of said deflection yoke;
C1 = capacitance of said first capacitor;
C2 = capacitance of said second capacitor.

6. A cathode ray tube beam deflection circuit comprising:

a deflection yoke having a first terminal connected to a first source of first potential;
a semiconductor switch connected between a second terminal of said yoke and a second potential;
a diode connected between said second terminal and said second potential and reverse biased with respect to the direction of positive current flow through said semiconductor switch;
a parallel resonant circuit including a first capacitor and a first inductor, said parallel resonant circuit being capacitively coupled through a second capacitor across said diode, wherein said capacitively coupled resonant circuit provides a dynamic focus voltage waveform and the only flyback capacitance in the circuit.

7. The cathode ray tube beam deflection circuit of claim 6 wherein a node, to which is connected one terminal each of said first and second capacitors and said first inductor, is coupled through a third capacitor to a cathode ray tube focus grid.

8. The cathode ray tube beam deflection circuit of claim 7 wherein said flygack capacitance is:

$$Ceq = \frac{2L1C2C1}{LyC2 + L1(C2 + C1) + \sqrt{(LyC2 + L1C2 + L1C1)^2 - 4(L1LyC2C1)}}$$

where:

Ceq = effective flyback capacitance;
L1 = inductance of said first inductor;
Ly = inductance of said deflection yoke;
C1 = capacitance of said first capacitor;
C2 = capacitance of said second capacitor.

* * * * *